Figure 1:
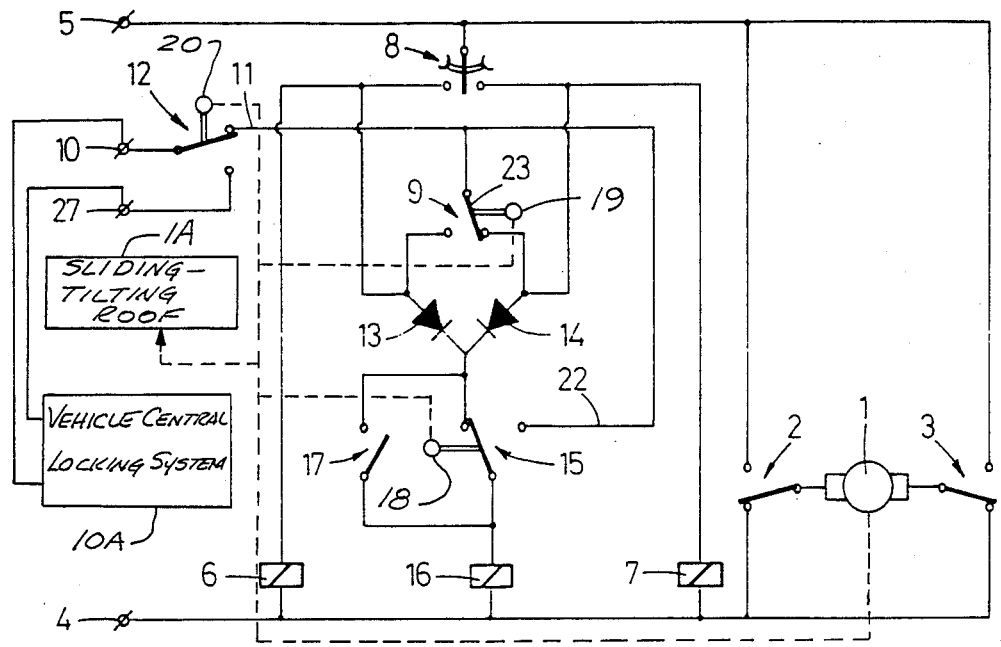

United States Patent [19]

Huyer

[11] Patent Number: 4,916,369
[45] Date of Patent: Apr. 10, 1990

[54] CONTROL SYSTEM FOR A SLIDING-TILTING ROOF OF A MOTOR VEHICLE

[75] Inventor: Johannes N. Huyer, Velserbroek, Netherlands

[73] Assignee: Vermeulen-Hollandia Octrooien II B.V., Netherlands

[21] Appl. No.: 228,690

[22] Filed: Aug. 4, 1988

[30] Foreign Application Priority Data

Sep. 15, 1987 [NL] Netherlands .......................... 8702194

[51] Int. Cl.$^4$ .............................................. H02P 5/00
[52] U.S. Cl. ..................................... 318/286; 318/266; 307/10.2
[58] Field of Search ............... 318/282, 283, 286, 280, 318/266, 467, 466; 307/10.1, 10.2; 340/641; 296/216, 218

[56] References Cited

U.S. PATENT DOCUMENTS

| | | | |
|---|---|---|---|
| 4,205,325 | 5/1980 | Haygood et al. .............. | 307/10.2 X |
| 4,427,929 | 1/1984 | Andrei-Alexandru et al. .... | 318/282 |
| 4,545,343 | 10/1985 | Cook et al. .................... | 307/10.5 X |
| 4,556,835 | 12/1985 | Vogel et al. .................... | 318/663 |
| 4,575,706 | 3/1986 | Heidman, Jr. ................. | 340/641 X |
| 4,629,953 | 12/1986 | Inoue et al. ..................... | 318/286 X |
| 4,644,235 | 2/1987 | Ohta ............................... | 318/282 |
| 4,691,801 | 9/1987 | Mann et al. .................... | 367/10.2 X |

Primary Examiner—William M. Shoop, Jr.
Assistant Examiner—A. Jonathan Wysocki
Attorney, Agent, or Firm—Kinney & Lange

[57] ABSTRACT

A control system for a sliding-tilting roof of a motor vehicle comprises a motor for moving the sliding-tilting roof and an electrical circuit with a manually operable operating means for energizing the motor for moving the sliding-tilting roof to its closed or open position, respectively. Said electrical circuit comprises an input to be connected to a central locking system which provides a closing signal upon locking of the vehicle. Said electrical circuit further comprises a detecting means for determining the position of the sliding-tilting roof and said circuit energizes the motor for moving the roof to its closed position when the detecting means signals an open position of the sliding-tilting roof.

8 Claims, 1 Drawing Sheet

CONTROL SYSTEM FOR A SLIDING-TILTING ROOF OF A MOTOR VEHICLE

The invention relates to a control system for a sliding-tilting roof of a motor vehicle, comprising a motor for moving the sliding-tilting roof and an electrical circuit with a manually operable operating means for energizing the motor for moving the sliding-tilting roof to its closed or open position, respectively.

Such a control system is for example known from DE-A-33 24 107. This known control system includes a relatively complicated electronic circuit, wherein the motor is connected in a control loop which equalises the position of the sliding-tilting roof to the desired position indicated by the operating means. Although this known circuitry can be connected to a central locking system which upon locking the vehicle supplies a closing signal to the respective actuating devices for closing the windows, the roof and a door locking means, the known control system is relatively expensive due to the complicated electronic circuitry. Up to the present it was not possible to connect a simple control system to a central locking system.

The invention aims to provide a control system of the above-mentioned type which is made simple but nevertheless can be connected to a central locking system.

To this end the control system according to the invention is characterized in that said circuit comprises an input to be connected to a central locking system which provides a closing signal upon locking of the vehicle, where said circuit further comprises a detecting means for determining the position of the sliding-tilting roof and said circuit energizes the motor for moving the roof to its closed position when the detecting means signals an open position of the sliding-tilting roof.

In this manner the control system of the invention can be provided with a simple circuit equipped with electromechanical components such as relays and the like, wherein the detecting means provide the possibility to close the sliding-tilting roof in response to a control signal of the central locking system.

According to a very favourable embodiment of the invention said circuit on operating the operating means for opening the sliding-tilting roof de-energizes the motor in at least one predetermined intermediate position of the sliding-tilting roof, wherein said detecting means on operating the operating means for closing the sliding-tilting roof maintains the motor in operation until the sliding-tilting roof has reached its closed position.

In this manner the sliding-tilting roof can be moved to a restricted number of open positions, wherein the attention of the driver of the vehicle can be completely directed to the traffic as the driver knows beforehand in which positions the sliding-tilting roof will stop. It is no longer required that be visually observes whether the roof has reached a desired position with the otherwise involved risks as is the case in the known control system. Due to the presence of the detecting means it is possible despite the presence of one or more intermediate positions, to move the sliding-tilting roof from an open position without interruption to the closed position.

According to a simple embodiment of the invention said circuit comprises a first switch means for stopping the motor by short circuiting the same wherein a cam means is provided which is synchronously movable with the sliding-tilting roof with respect to said switch means, said cam means having a cam way with a plurality of cams for actuating said switch means, wherein the detecting means renders inactive said switch means during the closing movement until the closed position is reached.

Preferably the detecting means includes a second switch means which can be actuated by a second cam way of the cam means.

According to a favourable embodiment of the invention a make-and-break contact of a relay is provided at both sides of the motor, wherein each of said make-and-break contacts with corresponding de-energized relay connects the corresponding terminal of the motor to one pole of a power source and with energized relay to the other pole of the power source, wherein the excitation coils of both relays are connected on the one side to said one pole of the power source and on the other side are connectable alternatively to said other pole of the power source through the operating means made as a reversing switch with non-connected centre position, wherein said first switch means on operation by a cam of the first cam way energizes the relay which is not energized by the operating means upon manual operation, while said second switch means during the closing movement of the sliding-tilting roof interrupts the connection between the first switch means and said relay.

Thereby the advantage is obtained that the motor current is switched by relay contacts and that the operating means and the switch means only need to carry the excitation currents for the relays. The switch means can be simple micro switches and further standard relays can be used.

The invention will be further explained by reference to the drawings in which an embodiment is shown.

FIG. 1 shows a circuit diagram of an embodiment of the control system according to the invention.

Figure 2:
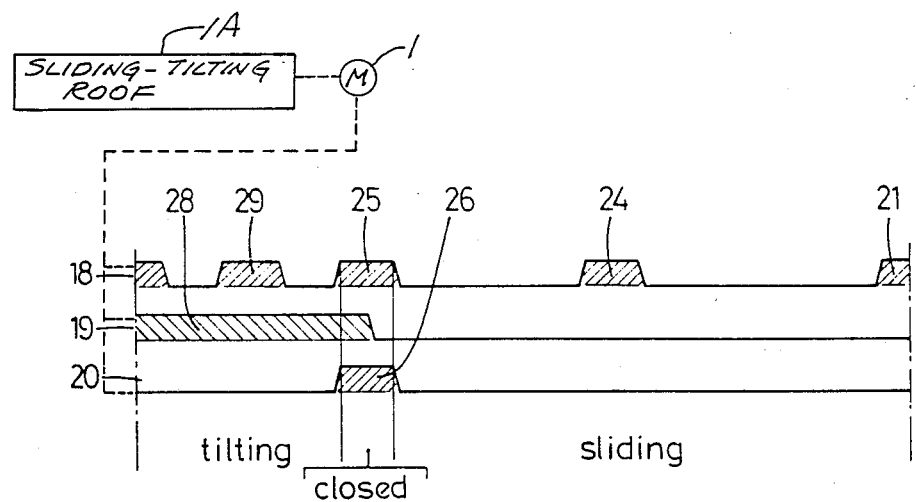

FIG. 2 schematically shows the cam means of the control system according to FIG. 1.

Referring to FIG. 1 there is shown a control system for a sliding-tilting roof 1A for opening and closing an opening in a roof of a motor vehicle. The sliding-tilting roof 1A is movable by means of an electromotor 1, each of the terminals of which can be connected to the minus pole 4 and the positive pole 5 of a power source (not shown) through a make-and-break contact 2 and 3, respectively. The make-and-break contacts 2, 3 together form a pole reversing switch through which the electromotor 1 can be connected to the power source for operation in one or the opposite rotational direction, respectively. A typical sliding-tilting roof construction is shown in U.S. Pat. No. 4,841,205. Vehicle central locking systems also are well known, and comprise a system wherein when a signal is given, or one door rearwardly locked, all doors will lock.

The make-and-break contacts 2, 3 are part of a relay 6 and 7, respectively, the excitation coils of which are connected directly to the minus pole 4 on the one side and are connectable to the positive pole 5 through a manually operable reversing switch 8 on the other side. The reversing switch 8 has an open rest position determined by a spring (not shown) which rest position is shown in FIG. 1. The relay 6 is provided for opening the roof opening by sliding while the relay 7 is provided for opening the roof opening by tilting. When the sliding-tilting roof 1A is in an open position, the situation is reversed and the relay 6 operates for closing from an open position reached by tilting and the relay 7 for closing from an open position reached by sliding.

Further the excitation coils of the relays 6, 7 at the side connected to the reversing switch 8 are also connected to a reversing switch 9 made as a microswitch, through which switch the excitation coils of the relays 6, 7 can be connected to an input terminal 10 through which the circuit shown is connectable to a central locking system 10A. Upon locking the vehicle this central locking system 10A provides a closing signal in the form of a positive supply voltage corresponding with the voltage of the power source. A line 11 connects a reversing switch micro 12 between the reversing switch 9 and the input 10. When the closing signal is a voltage pulse of short duration, the reversing switch 12 can be directly followed by an auxiliary relay connected between the line 11 and the minus pole 4, wherein a make contact of this auxiliary relay connects the positive pole 5 with the input 10. Therefore, both relays 6, 7 can also be energized through this input 10.

To the side of the excitation coils of the relays 6, 7 connected to the reversing switches 8, 9 two diodes 13, 14 are connected which are connected to each other at their other side and are coupled through a reversing switch 15 made as a microswitch to the excitation coil of an auxiliary relay 16 which is connected to the minus pole 4 at their other sides. A make contact 17 of the auxiliary relay 16 is connected in parallel with the reversing switch 15.

The three reversing switches 9, 12 and 15 are operable through a cam means with three cam ways 18, 19 and 20 which are schematically shown in FIG. 2. The cam means is driven by the electromotor 1 synchronously with the sliding-tilting roof. The cam way 18 operates the reversing switch 15, the cam way 19 the reversing switch 9 and the cam way 20 the reversing switch 12. The cams of the cam ways are indicated by a raised shaded part and each cam reverses the corresponding reversing switch from the shown position determined by a spring to the not shown position.

The operation of the described control system is as follows.

It is assumed that the sliding-tilting roof 1A is in its fully open position reached by sliding, so that a last cam 21 of the cam way 18 moved the reversing switch 15 in its not shown position. In this position the reversing switch 15 connects the excitation coil of the auxiliary relay 16 with the switching arm 23 of the reversing switch 9 through a line 22. The reversing switches 9 and 12 are in their solid line or shown position. Now, when the vehicle is locked and the central locking system 10 A provides a closing signal to terminal 10, the relay 7 is energized through the input 10, the reversing switch 12, the line 11 and the reversing switch 9. Thereby the make-and-break contact 3 is moved from its shown or solid line position and the electromotor 1 is energized for closing the sliding-tilting roof. As soon as the cam 21 of the cam way which is driven by electro-motor 1; same leaves the reversing switch 15, the switch 15 arrives in its shown position and the auxiliary relay 16 will be energized again through line 11 and thereby the make contact 17 will be closed. When the cam 24 provided for stopping the electromotor in an intermediate position as will be explained hereinafter, reaches switch 15, this switch will be reversed to its not shown position, which, however has no effect because reversing switch 9 is in its shown position. The electromotor 1 is therefore not stopped. Subsequently the cam 25 of the cam way 18 will reverse the reversing switch 15 to its not shown position again. The motor 1 is now stopped because a cam 26 of the cam way 20 simultaneously reverses the switch 12 to its not shown-position, in which the input 10 is connected with an output 27, through which output it is indicated to the central locking system 10A, that the sliding-tilting roof 1A has reached its closed position.

If the sliding-tilting roof 1A is in a tilted position, the reversing switch 9 is moved to its not shown position by a cam 28 of the cam way 19. Upon locking the vehicle the relay 6 will be energized whereafter closing of the sliding-tilting roof 1A takes place in the above-described manner. The cam 28 of the cam way 19 extends along the whole tilting movement distance of the cam means up to half-way the cams 25 and 26 of the cam ways 18 and 20. The cam way 19 and the reversing switch 9 therefore operate as a detecting means for determining the position of the sliding-tilting roof, which detecting means indicates whether the sliding-tilting roof 1A has been moved in an open position by tilting or sliding.

Due to the presence of the reversing switch 9 it is possible to provide one or more open intermediate positions for the sliding-tilting roof 1A, wherein the closing movement from each open position can nevertheless take place without interruption. Thereby the manufacturer of sliding-tilting roofs has the possibility to predetermine an optimum choice of intermediate position so that the driver can concentrate his attention fully on traffic during operation of the operating means 8.

For sliding the sliding-tilting roof 1A to an open position the operating means 8 is pressed for energizing the relay 6. Thereby the make-and-break contact 2 is reversed and the electromotor 1 slides the roof open. As soon as the cam 25 leaves the reversing switch 15, this switch goes to its shown position whereby the auxiliary relay 16 is energized and thereby the make contact 17 is closed. When in these circumstrances the cam 24 determining an intermediate position, reverses the switch 15 to its not shown position again, the voltage on the relay 16 is provided to the relay 7 through the line 22 and the reversing switch 9 which is in its shown position, so that the make-and-break contact 3 is also reversed and the motor 1 is short circuited through its supply lines.

When the user wants to close the sliding-tilting roof 1A fully opened by sliding, the operating means 8 is operated in such manner that the relay 7 is energized. As soon as the cam 21 leaves the reversing switch 15, the auxiliary relay 16 is again energized and thereby the make contact 17 is closed. When the cam 24 moves the reversing switch 15 back to its not shown position, the voltage on the relay 16 is provided to the relay 7 through the switch 9, which relay 7 however was already energized through switch 8 so that the motor 1 remains energized for closing the sliding-tilting roof. When the cam 25 moves the reversing switch 15 to its not shown position, the motor 1 remains energized until the cam 28 reverses the reversing switch 9. Thereby the relay 6 is energized so that the motor 1 is short circuited through its supply lines. A corresponding operation takes place during closing the sliding-tilting roof from a fully open position reached by tilting. In this case the motor 1 remains energized until the cam 28 leaves the switch 9.

Although the cam way 18 is shown in the drawing with only one cam 24 for an intermediate position during sliding and one cam 29 for an intermediate position during tilting, it is of course possible to provide more cams for intermediate positions.

The cam means can be made in several ways and may for example be made as a cam disk or a cam plate.

The invention is not restricted to the above-described embodiment which can be varied in a number of ways within the scope of the invention.

I claim:

1. Control system for a sliding-tilting roof of a motor vehicle, comprising a motor for moving the sliding-tilting roof and an electrical circuit with a manually operable operating means for energizing said motor for moving the sliding-tilting roof to its closed or open position, respectively, wherein said electrical circuit comprises an input to be connected to a vehicle central locking system which provides a closing signal upon locking of the vehicle, said circuit further comprising a detecting means for determining the position of the sliding-tilting roof and means for energizing the motor for moving the roof to its closed position upon receipt of the central locking system signal when the detecting means indicates an open position of the sliding-tilting roof.

2. Control system according to claim 1, characterized in that the detecting means includes a second switch means which can be actuated by a second cam way of the cam means.

3. Control system according to claim 2, characterized in that said second cam way has a length correlated to the entire tilting movement distance of the cam means and has a cam operable up to substantially half the operation of the cam of the first cam way which determines the closed position of the sliding-tilting roof.

4. Control system according to claim 2 characterized in that a make-and-break contact of a relay is provided at both sides of the motor, wherein each of said make-and-break contacts with corresponding de-energized relay connects the corresponding terminal of the motor to one pole of a power source and with energized relay to the other pole of the power source, wherein the excitation coils of both relays are connected on the one side to said one pole of the power source and on the other side are connectable alternatively to said other pole of the power source through the operating means made as a reversing switch having a non-connected center position, wherein said first switch means, upon operation by a cam of the first cam way, energizes the relay which is not energized by the operating means upon manual operation, while during the closing movement of the sliding-tilting roof the second switch means interrupts the connection between the first switch means and said relay energized by the operating means upon said manual operation.

5. Control system according to claim 4, characterized in that an auxiliary relay is connected in parallel to both relays for the motor through corresponding diodes, wherein said first switch means is provided between the junction of the diodes and the auxiliary relay, said first switch means being a two-way switch with a a normal position, wherein the switch connects the auxiliary relay and the junction of the diodes, wherein a make contact of the auxiliary relay is connected in parallel to the first switch means in normal position, the cam actuated position of the first switch means connecting the auxiliary relay to a common contact of the second switch means, said second switch means comprising a two-way switch with a normal position, and having output contacts which each are connected with a separate contact of the operating means, wherein the the central locking system is connected to provide a signal through a third switch means to the common contact of the second switch means and wherein the cam means is provided with a third cam way with a cam for operating the third switch means to disable the signal from the central locking system in the closed position of the sliding-tilting roof.

6. Control system according to claim 5, characterized in that said third switch means is a two-way switch, one output contact of which is connected to the switching arm of the second switch means and the other output contact of which provides means for indicating the closed position of the sliding-tilting roof.

7. Control system for a sliding-tilting roof of a motor vehicle, comprising a motor for moving the sliding-tilting roof and an electrical circuit with a manually operable operating means for energizing said motor for moving the sliding-tilting roof to its closed or open position, respectively, wherein said electrical circuit comprises an input to be connected to a central locking system which provides a closing signal upon locking of the vehicle, said electrical circuit further comprising detecting means for determining the position of the sliding-tilting roof, and means for energizing the motor for moving the roof to its closed position upon receipt of the central locking system signal when the detecting means also indicates an open position of the sliding-tilting roof, wherein on operating the operating means for opening the sliding-tilting roof, said electrical circuit is further adapted to de-energize the motor in at least one predetermined intermediate position of the sliding-tilting roof, and wherein when the operating means is operated for closing the sliding-tilting roof, the detecting means includes means for maintaining the motor in operation until the sliding-tilting roof has reached its closed position.

8. Control system for a sliding-tilting roof of a motor vehicle, comprising a motor for moving the sliding-tilting roof and an electrical circuit with a manually operable operating means for energizing said motor for moving the sliding-tilting roof to its closed or open position, respectively, wherein said electrical circuit comprises an input to be connected to a central locking system which provides a closing signal upon locking of the vehicle, said electrical circuit further comprising detecting means for determining the position of the sliding-tilting roof, and means for energizing the motor for moving the roof to its closed position upon receipt of the central locking system signal when the detecting means also indicates an open position of the sliding-tilting roof, wherein said electrical circuit comprises first switch means for stopping the motor by short circuiting the same, and cam means synchronously movable with the sliding-tilting roof with respect to said switch means, said cam means having a cam way with a plurality of cams for actuating said switch means, the detecting means also including means to render said switch means inactive during the closing movement of the sliding tilting roof until the closed position is reached.

* * * * *